Patented Jan. 9, 1940

2,186,367

UNITED STATES PATENT OFFICE 2,186,367

HALO-ARYL ETHERS

Gerald H. Coleman and George B. Stratton, Midland, Mich., assignors to The Dow Chemical Company, Midland, Mich., a corporation of Michigan No Drawing. Application April 28, 1937, Serial No. 139,580

6 Claims. (Cl. 260—612)

This invention concerns certain new glycol ethers and a method of making the same.

The new ethers herein disclosed have the general formula

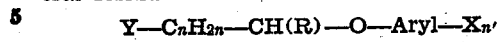

wherein Y represents chlorine or a nuclear halogenated aryloxy radical of the benzene series attached to a primary or secondary carbon atom, R represents hydrogen or an alkyl group, Aryl represents an aromatic radical of the benzene series, X represents halogen attached to the nucleus of said aromatic radical, and $n$ and $n'$ are integers, $n$ being at least 2 when Y is a halogenated aromatic radical. They vary from liquids to crystalline solids at room temperature and may be employed as solvents and plasticizers in compositions comprising cellulose derivatives, resins, etc., or as chemical agents from which a variety of other organic compounds may be prepared. The di-(halo-aryl) ether products may also be employed as ingredients in dielectric compositions.

The ethers having the above formula are prepared by heating a dichloro-aliphatic hydrocarbon to a reaction temperature with a nuclear halogenated metal phenate (or a mixture of the corresponding halo-phenol and a metal hydroxide) in the presence or absence of a reaction medium, such as water, benzene, etc. The dichloro-aliphatic hydrocarbon reactant is a saturated compound containing the chlorine substituents on different primary or secondary carbon atoms. Among the various dichloro-aliphatic hydrocarbons which may be employed are ethylene chloride, propylene chloride, butylene chloride, an amylene chloride, a hexylene chloride, 1,3-dichloro-propane, 1,4-dichloro-butane, 1,3-dichloro-isobutane, etc. The halo-phenolic reactant is a nuclear halogenated phenol of the benzene series, e. g. chloro-phenol, trichloro-phenol, 4-chloro-2-methoxy-phenol, 2-chloro-4-ethoxy-phenol, bromo-phenol, 2-chloro-4-bromo-phenol, chloro-cresol, 2-chloro-4-tertiary-butyl-phenol, 2,6-diethyl-4-chloro-phenol, 2,6-dichloro-4-tertiary-butyl-phenol, 2-chloro-4-tertiary-butyl-6-methyl-phenol, etc., or a metal salt, preferably an alkali metal salt, of such halo-phenol. The metal hydroxide, when used, is preferably an alkali metal compound, e. g. sodium or potassium hydroxide, although other metal hydroxides, e. g. calcium or barium hydroxide, may be employed.

The reactants may be employed in any desired proportions, but for sake of economy and to avoid side reactions which may occur, especially when water is used as a reaction medium, the metal hydroxide is preferably employed in a proportion not greatly exceeding that required to form a salt of the halo-phenol. When a mono-(halo-aryl) ether of a halo-aliphatic hydrocarbon is the product desired, one molecular equivalent or more of the dihalo-aliphatic hydrocarbon reactant is preferably employed per mole of the halo-phenol reactant. When a di-(halo-aryl) ether of a glycol is desired, approximately two moles of a halo-phenol, or metal salt thereof, is preferably used per mole of the dihalo-aliphatic hydrocarbon reactant.

The reaction usually occurs smoothly at temperatures between 75° and 125° C., but may be carried out at considerably higher temperatures if desired. It may be effected by heating the reaction mixture under reflux at atmospheric pressure or by heating it under pressure in a bomb or autoclave. The time of heating required to complete the reaction may vary from a few minutes to a day or longer, depending upon the particular reactants employed, the temperature at which the reaction is carried out, etc.

Usually a mono-(halo-aryl) ether of a chloro-aliphatic hydrocarbon and the corresponding di-(halo-aryl) ether of a glycol are produced simultaneously in the process, although the reaction conditions may be controlled, as hereinbefore explained, so as to obtain either of said ethers as the major product. The products are separated and purified by conventional procedure, e. g. distillation or crystallization.

The mono-(halo-aryl) ether products have the general formula

wherein R represents hydrogen or an alkyl radical, Aryl represents an aromatic radical of the benzene series, X represents halogen attached to the nucleus of said aromatic radical, and $n$ and $n'$ are integers, $n$ having any value but usually being not greater than 5 and $n'$ having any value from 1 to 5. They are usually colorless liquids at room temperature but are sometimes obtained as solids.

The di-(halo-aryl) ethers of glycols have the formula

wherein R, Aryl, X, $n$, and $n'$ carry the meanings hereinbefore stated. They are usually colorless solids.

The following examples illustrate a number of ways in which the principle of the invention has been practiced, but are not to be construed as limiting the invention.

Example 1

A mixture of 1 gram mol of 2-chloro-phenol, 1 gram mol of ethylene chloride, 1 gram mol of sodium hydroxide, and 5.5 gram mols of water was heated under reflux at temperatures between 74° and 95° C. for 40 hours. The mixture was then cooled, washed with water to remove sodium chloride therefrom, after which it was distilled under vacuum to separate the major reaction product. There was obtained 1-chloro-2-(2-chloro-phenoxy)-ethane, a colorless liquid, boiling at approximately 142° to 144° C. under 21.5 millimeters pressure, having a specific gravity of about 1.286 at 20° C. with respect to water at 4° C., and having the formula;

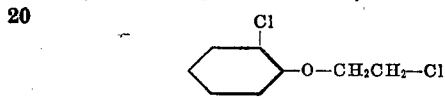

The yield was 76 per cent of theoretical, based upon the 2-chloro-phenol consumed in the reaction.

Example 2

A mixture of 1 gram mol of 4-chloro-phenol, 1 gram mol of ethylene chloride, 1 gram mol of sodium hydroxide, and 5.5 gram mols of water was heated under reflux at temperatures between 74.5° and 95° C. for 27 hours, after which the product was separated as in Example 1. There was obtained 1-chloro-2-(4-chloro-phenoxy)-ethane, a white crystalline compound boiling at approximately 184° to 186° C. at 92 millimeters pressure, melting at about 39° to 39.5° C., and having the formula;

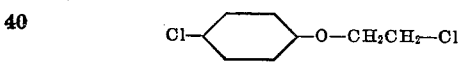

The yield was approximately 73 per cent of theoretical based upon the 4-chloro-phenol consumed in the reaction.

Example 3

A mixture of 1 gram mol of 2,4-dichloro-phenol, 1 gram mol of ethylene chloride, 1 gram mol of sodium hydroxide, and 5.5 gram mols of water was heated under reflux at temperatures between 74.5° and 93° C. for 50 hours, after which the product was separated as in Example 1. There was obtained 1-chloro-2-(2,4-dichloro-phenoxy)-ethane, a colorless liquid boiling at approximately 134° to 135° C. at 5.5 millimeters pressure, having a specific gravity of about 1.397 at 20° C., and having the formula;

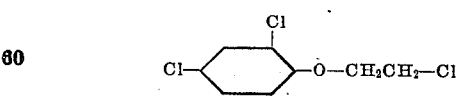

The yield was approximately 77 per cent of theoretical based upon the 2,4-dichloro-phenol consumed.

Example 4

A mixture of 1 gram mol of 2,4,6-trichloro-phenol, 1 gram mol of ethylene chloride, 1 gram mol of sodium hydroxide, and 11.1 gram mols of water was heated under reflux at temperatures between 73° and 88° C. for 66 hours, after which the product was separated as in Example 1. There was obtained 1-chloro-2-(2,4,6-trichloro-phenoxy)-ethane, a white crystalline compound boiling at approximately 140°–142° C. at 6 millimeters pressure, melting at about 31° C., and having the formula;

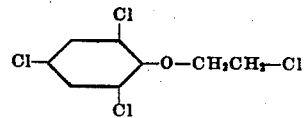

The yield was approximately 84.5 per cent of theoretical based upon the trichloro-phenol consumed in the reaction.

Example 5

A mixture of 1 gram mol of 4-bromo-phenol, 1 gram mol of ethylene chloride, 1 gram mol of sodium hydroxide, and 5.5 gram mols of water was heated under reflux at temperatures between 74° and 94.5° C. for 31 hours, after which the product was separated as in Example 1. There was obtained 1-chloro-2-(4-bromo-phenoxy)-ethane, a white crystalline compound boiling at approximately 135° C. at 6.5 millimeters pressure, melting at about 58° to 58.5° C., and having the formula;

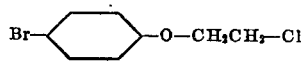

The yield was approximately 84 per cent of theoretical based upon the bromo-phenol consumed in the reaction.

Example 6

A mixture of 1 gram mol of 2-chloro-4-tertiary-butyl-phenol, 1 gram mol of ethylene chloride, 1 gram mol of sodium hydroxide, and 11.1 gram mols of water was heated under reflux at temperatures between 77° and 98.4° C. for 24 hours, after which the product was separated as in Example 1. There was obtained 1-chloro-2-(2-chloro-4-tertiary-butyl-phenoxy)-ethane, a colorless liquid boiling at approximately 150° to 151° C. under 6 millimeters pressure, having a specific gravity of about 1.150 at 20° C., and having the formula;

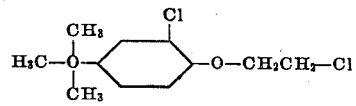

Example 7

A mixture of 1 gram mol of 4-chloro-phenol, 1 gram mol of propylene chloride, 1 gram mol of sodium hydroxide, and 5.5 gram mols of water was heated under reflux at temperatures between 82.5° and 86° C. for 58 hours. The mixture was then cooled, washed with water to remove sodium chloride therefrom, dried and distilled under vacuum to separate the ether products. The fraction distilling at temperatures between 182° and 184° C. under 92 millimeters pressure consisted of a liquid chloro-phenoxy-propyl chloride having a specific gravity of about 1.235 at 20° C. and having the formula;

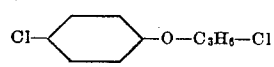

The yield of said product was approximately 44 per cent of theoretical based upon the chloro-phenol consumed in the reaction. As residue from the distillation there was obtained a 9 per cent yield of a di-(chloro-phenoxy)-propane, which product was a white crystalline compound melting at approximately 131.5° to 132.5° C. and having the formula;

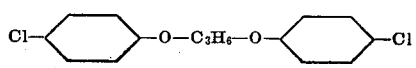

Example 8

2,4-dichloro-phenol was reacted with propylene chloride in the presence of sodium hydroxide and water and the resultant ether products were separated as in Example 7. There was obtained a 2,4-dichloro-phenoxy-propyl chloride as a colorless liquid boiling at temperatures between about 142° and 144° C. at 7 millimeters pressure, having a specific gravity of about 1.334 at 20° C., and having the formula;

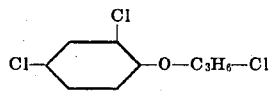

As residue from the distillation there was obtained 11 per cent of theoretical yield of a di-(2,4-dichloro-phenoxy)-propane as a white crystalline compound melting at 129.5° to 131° C. and having the formula;

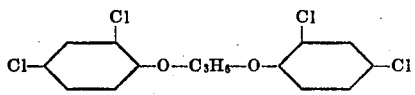

Said yields are based upon the dichloro-phenol consumed in the reaction.

Example 9

2,4,6-trichloro-phenol was reacted with propylene chloride in the presence of sodium hydroxide and water and the products were separated as in Example 7. There was obtained 59 per cent the theoretical yield of 2,4,6-trichloro-phenoxy-propyl chloride, a colorless liquid boiling at approximately 141° to 143° C. under 5 millimeters pressure, having a specific gravity of about 1.435 at 20° C., and having the formula;

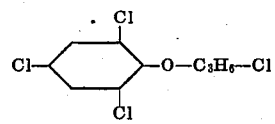

As residue from the distillation there was obtained 16 per cent of theoretical yield of a di-(2,4,6-trichloro-phenoxy)-propane in the form of a white crystalline compound melting at about 161° to 162° C. and having the formula;

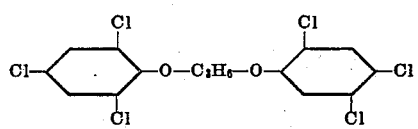

Said yields are based upon the trichloro-phenol consumed in the reaction.

Example 10

4-bromo-phenol was reacted with propylene chloride in the presence of sodium hydroxide and water and the products were separated as in Example 7. There was obtained 38.5 per cent the theoretical yield of a 4-bromo-phenoxy-propyl chloride in the form of a colorless liquid boiling at approximately 150° to 151° C. under 15 millimeters pressure, having a specific gravity of about 1.455 at 20° C., and having the formula;

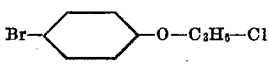

As the still residue there was obtained 8 per cent of theoretical yield of a di-(4-bromo-phenoxy)-propane in the form of a white crystalline compound melting at approximately 132.5° to 134.5° C. and having the formula;

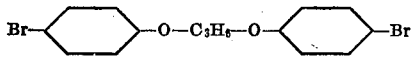

Said yields are based upon the bromo-phenol consumed in the reaction.

Example 11

4-chloro-phenol was reacted with 1,2-dichloro-normal-butane in the presence of sodium hydroxide and water as in Example 7. The mixture was then washed with water and distilled under vacuum. During the distillation there was collected chloro-phenoxy-butyl chloride, a colorless liquid boiling at approximately 122° to 125° C. under 5 millimeters pressure, having a specific gravity of about 1.191 at 20° C., and having the formula;

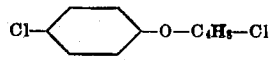

The residue from the distillation was a dark colored solid resin consisting largely of di-(chloro-phenoxy)-butane having the formula;

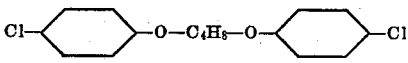

Example 12

4-chloro-phenol was reacted with 1,3-dichloro-iso-butane in the presence of sodium hydroxide and water as in Example 7. The reacted mixture was then washed with water and distilled to separate the ether products. There were obtained 46 per cent the theoretical yield of 1-chloro-3-(4-chloro-phenoxy)-isobutane, a colorless liquid boiling at approximately 130° to 133° C. at 4.5 millimeters pressure, having the specific gravity of about 1.201 at 20° C., and having the formula;

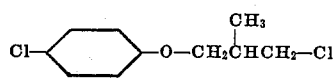

and a 16 per cent yield of 1,3-di-(4-chloro-phenoxy)-isobutane, a nearly solid colorless resin, boiling at approximately 220° to 230° C. at 4.5 millimeters pressure, having a specific gravity of about 1.254 at 20° C. and having the formula;

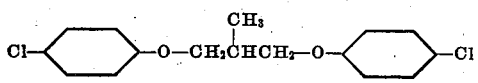

Said yields are based upon the chloro-phenol consumed in the reaction.

Example 13

4-bromo-phenol was reacted with 1,3-dichloro-isobutane in the presence of sodium hydroxide and water, after which the reacted mixture was washed with water and distilled. The fraction distilling at temperatures between 120° and 122° C. at 2 millimeters pressure was 1-chloro-3-(4-bromo-phenoxy)-isobutane, a viscous colorless liquid, having a specific gravity of about 1.421 at 20° C. and having the formula;

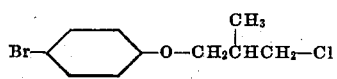

The yield of said product was approximately 65 per cent of theoretical based upon the bromo-phenol consumed in the reaction. The residue from the distillation consisted largely of 1,3-di- (4-chloro-phenoxy)-isobutane, a nearly solid resin having the formula;

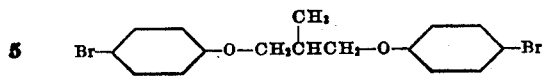

Example 14

2-methyl-4-bromo-5-isopropyl-phenol was reacted with 1,3-dichloro-isobutane in the presence of sodium hydroxide and water as in Example 7. The reacted mixture was washed with water and unreacted starting materials were distilled from the product. The latter was a nearly black solid resin comprising 1-chloro-3-(2-methyl-4-bromo-5-isopropyl-phenoxy)-isobutane and 1,3-di(2-methyl-4-bromo-5-isopropyl-phenoxy)-isobutane, which compounds have the following respective formulas;

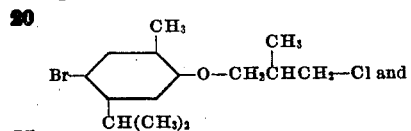

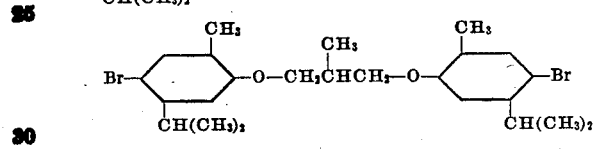

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. An ether having the general formula;

Cl—$C_nH_{2n}$—CH(R)—O—Aryl—$X_{n'}$ wherein R represents a substituent selected from the class consisting of hydrogen and alkyl substituents, Aryl represents an aromatic radical of the benzene series, X represents halogen attached to the nucleus of said aromatic radical, and $n$ and $n'$ are integers.

2. An ether having the general formula;

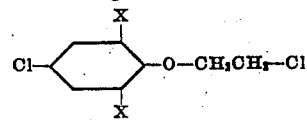

wherein X represents a substituent selected from the class consisting of hydrogen and chlorine substituents.

3. Trichloro-phenoxy-propyl chloride, a white crystalline compound boiling at approximately 140° to 142° C. at 6 millimeters pressure, melting at approximately 31° C., and having the formula;

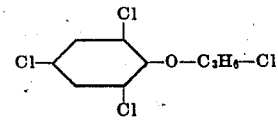

4. 2.4-dichloro-phenoxy ethyl chloride, a colorless liquid boiling at approximately 134° to 135° C. at 5.5 millimeters pressure, having a specific gravity of about 1.397 at 20° C. and having the formula;

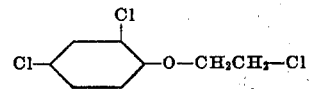

5. An ether having the general formula;

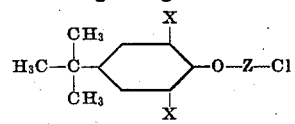

wherein X represents a substituent selected from the class consisting of hydrogen and chlorine substituents and Z represents an alkylene radical containing from 2 to 5 carbon atoms.

6. 2-chloro-4-tertiary-butyl-phenoxy-ethyl chloride, a liquid boiling at approximately 150° to 151° C. at 6 millimeters pressure, having a specific gravity of 1.150 at 20° C. and having the formula;

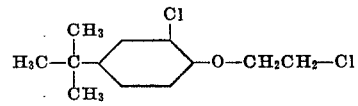

GERALD H. COLEMAN.
GEORGE B. STRATTON.

Certificate of Correction

Patent No. 2,186,367.

January 9, 1940.

GERALD H. COLEMAN ET AL.

It is hereby certified that errors appear in the printed specification of the above numbered patent requiring correction as follows: Page 2, second column, lines 44 to 47, Example 6, strike out the formula and insert instead the following—

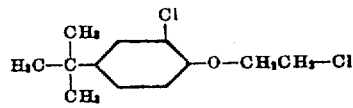

page 3, first column, lines 50 to 55, Example 9, strike out the formula and insert instead the following—

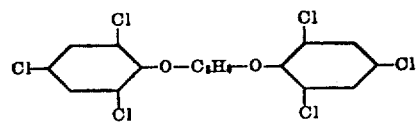

and that the said Letters Patent should be read with these corrections therein that the same may conform to the record of the case in the Patent Office.

Signed and sealed this 19th day of March, A. D. 1940.

[SEAL]

HENRY VAN ARSDALE,
*Acting Commissioner of Patents.*